US011331846B2

(12) United States Patent
Pense et al.

(10) Patent No.: US 11,331,846 B2
(45) Date of Patent: May 17, 2022

(54) APPARATUS AND A METHOD FOR FORMING PLASTIC PREFORMS INTO PLASTIC BOTTLES WITH A MOVABLE BOTTOM PORTION (71) Applicant: KRONES AG, Neutraubling (DE)

(72) Inventors: Andreas Pense, Regensburg (DE); Thomas Philipp, Eilsbrunn (DE); Gerald Huettner, Vilseck (DE); Dieter Finger, Neutraubling (DE); Andreas Steiner, Wenzenbach (DE)

(73) Assignee: KRONES AG, Neutraubling (DE)

( * ) Notice: Subject to any disclaimer, the term of this patent is extended or adjusted under 35 U.S.C. 154(b) by 296 days.

(21) Appl. No.: 16/480,399

(22) PCT Filed: Feb. 13, 2018

(86) PCT No.: PCT/EP2018/053540
§ 371 (c)(1),
(2) Date: Jul. 24, 2019

(87) PCT Pub. No.: WO2018/146331
PCT Pub. Date: Aug. 16, 2018

(65) Prior Publication Data
US 2019/0351602 A1 Nov. 21, 2019

(30) Foreign Application Priority Data
Feb. 13, 2017 (DE) .................. 10 2017 102 837.4

(51) Int. Cl.
B29C 49/48 (2006.01)
B29C 49/12 (2006.01)
(Continued)

(52) U.S. Cl.
CPC .......... B29C 49/4823 (2013.01); B29C 49/12 (2013.01); B29C 49/36 (2013.01);
(Continued)

(58) Field of Classification Search
None
See application file for complete search history.

(56) References Cited

U.S. PATENT DOCUMENTS 8,162,641 B2 4/2012 Sperka
9,004,897 B2 4/2015 Langlois
(Continued)

FOREIGN PATENT DOCUMENTS

CA 2927729 12/2016
CN 2690141 4/2005
(Continued)

OTHER PUBLICATIONS

German Search Report dated Nov. 23, 2017 issued in corresponding German Application No. 102017102837.4.
(Continued)

Primary Examiner — Monica A Huson
(74) Attorney, Agent, or Firm — Onello & Mello, LLP (57) ABSTRACT A forming unit (20) for forming plastic preforms into plastic bottles, wherein the forming unit comprises a blow mould (20) having a first lateral portion (4), a second lateral portion (6) and a bottom portion (2), wherein said lateral portions as well as the bottom portion (2) form a cavity (15), within which the plastic preforms (10) can be formed into the plastic bottles, wherein the bottom portion (2) can be moved relative to the lateral portions (4) in a closed condition of the blow mould, wherein the forming unit (20) comprises a drive unit in order to move the bottom portion (2) relative to the lateral portions (4, 6), wherein the drive unit preferably has a movable piston element (32) which ist movable along a predefined stroke path. According to the invention, the apparatus has a first stroke path limiting means (22, 24) that limits the stroke path of the bottom portion (2) and/or of the piston element (32) in a first direction, wherein this stroke path limiting means (22, 24) is adjustable in order to modify the stroke path.

13 Claims, 4 Drawing Sheets (51) Int. Cl.
  *B29C 49/36* (2006.01)
  *B29C 49/78* (2006.01)
  *B29L 31/00* (2006.01)

(52) U.S. Cl.
  CPC ...... *B29C 49/78* (2013.01); *B29C 2049/4828* (2013.01); *B29C 2049/4892* (2013.01); *B29C 2949/7805* (2013.01); *B29C 2949/78336* (2013.01); *B29C 2949/78563* (2013.01); *B29C 2949/78848* (2013.01); *B29L 2031/7158* (2013.01)

(56) References Cited

U.S. PATENT DOCUMENTS

| | | |
|---|---|---|
| 9,676,140 B2 | 6/2017 | Deau et al. |
| 10,118,330 B2 | 11/2018 | Cirette et al. |
| 10,437,267 B2 | 10/2019 | Brunner et al. |
| 2010/0310691 A1 | 12/2010 | Sperka |
| 2013/0224325 A1 | 8/2013 | Langlois |
| 2014/0145378 A1 | 5/2014 | Deau et al. |
| 2016/0031148 A1* | 2/2016 | Hendrickson ............ B65D 1/40 264/523 |
| 2016/0139613 A1 | 5/2016 | Brunner et al. |
| 2017/0021550 A1 | 1/2017 | Derrien et al. |
| 2017/0036389 A1 | 2/2017 | Cirette et al. |
| 2017/0232656 A1 | 8/2017 | Derrien et al. |
| 2017/0326780 A1 | 11/2017 | Protais et al. |

FOREIGN PATENT DOCUMENTS

| | | |
|---|---|---|
| CN | 105599280 | 5/2016 |
| FR | 3027248 | 4/2016 |
| FR | 3029133 | 6/2016 |
| WO | 2016083711 | 11/2017 |

OTHER PUBLICATIONS

International Search Report and Written Opinion dated Jun. 5, 2018 issued in corresponding International Application No. PCT/EP2018/053540.

Chinese Office Action dated Feb. 3, 2021 issued in corresponding Chinese Application No. 2018800114687, with English translation.

* cited by examiner

APPARATUS AND A METHOD FOR FORMING PLASTIC PREFORMS INTO PLASTIC BOTTLES WITH A MOVABLE BOTTOM PORTION

The present invention relates to a forming unit for forming plastic preforms into plastic containers, and to a corresponding forming method. Such apparatus and methods have been known from the prior art for a long time. The plastic preforms are usually inserted into a blow mould and are blown into plastic bottles by applying blow pressure. The most varied methods for this are known from the prior art. Recently, also methods have become known wherein during the expansion of the plastic preform into the plastic container, a bottom portion of the blow mould is moved, for example in order to achieve bends in the containers to be produced or in the bottoms thereof in a targeted manner. In the prior art, such methods are at times also referred to as active base methods. These methods and corresponding apparatus have proven to be useful, however at times the problem arises that an exact control of the corresponding container production is very difficult.

The present invention is therefore based on the object of providing an apparatus and a method which allow a more accurate control of the respective blow processes. According to the invention, these objects are achieved by means of the subject matters of the independent patent claims. Advantageous embodiments and further developments form the subject of the dependent claims.

A forming unit according to the invention for forming plastic preforms into plastic containers and in particular into plastic bottles comprises a blow mould that comprises a first lateral portion and a second lateral portion as well as a bottom portion. These lateral portions as well as the bottom portion form a cavity, within which the plastic preforms can be formed into the plastic bottles, wherein the bottom portion can be moved relative to the lateral portions in a closed condition of the blow mould, and wherein the forming unit further has a drive unit in order to move the bottom portion relative to the lateral portions. Moreover, the drive unit preferably has a movable piston element which is movable within a specified stroke path.

According to the invention, the apparatus has a first stroke path limiting means that limits the stroke movement or the stroke path of the bottom portion and/or of the piston element in a first direction, wherein this stroke path limiting means can be adjusted in order to modify the stroke path. Preferably, the apparatus has, as mentioned above, a piston element which is preferably mechanically coupled to the bottom portion, in particular in such a manner that the bottom portion and the piston element move together. However, it would also be conceivable to go without said piston element, in particular if the drive unit is an electrically operated drive unit.

A closed condition of the blow mould is understood to mean in particular a condition in which the two lateral portions, together with the bottom portion, form said cavity that is used for expanding the plastic preforms. Preferably, the closed condition is therefore a condition in which the plastic preforms are expanded by applying pressurised air onto them.

Therefore, an apparatus is proposed, in which the stroke path of the bottom portion can be adjusted relative to the lateral portions. In this way, better producible results can be achieved during the blow moulding process. It is also possible to adjust such limitations individually in an apparatus having a plurality of forming stations.

In a preferred embodiment, the apparatus has a carrier on which a plurality of said blow moulds or forming units are arranged. Advantageously, this is a rotatable carrier. In a further advantageous embodiment, each of these forming units has a bottom portion that can be moved relative to the lateral portions in a closed condition of the blow moulds. In an advantageous embodiment, the two lateral portions are movable relative to each other, preferably pivotable relative to each other and particularly preferably pivotable in relation to a pivot axis that extends parallel to a longitudinal axis of the plastic preforms to be expanded.

In a further preferred embodiment, the bottom portion of the blow mould is arranged on a carrier and is in particular arranged to be detachable. This carrier in turn can preferably be moved by means of a drive. In a further advantageous embodiment, the lateral portions are arranged at least indirectly on lateral portion carriers. Particularly preferably, carrier trays are arranged on the lateral portion carriers, and on these carrier trays the lateral portions of the blow moulds are in turn preferably arranged.

In a further advantageous embodiment, the forming unit has pressure fluid connectors in order to move the piston by means of air pressure. Thus, in this embodiment a pneumatic operation of the piston element and/or of the bottom portion is proposed. However, it would also be possible for the drive unit to be an electromotoric drive unit. In this case it would also be possible to go without said piston element.

Advantageously, the apparatus has an application unit in order to apply air pressure onto the plastic preform. In particular, this is here a so-called blow nozzle that can be attached to a mouth of the plastic preform in order to apply pressurised air thereto. Advantageously, different air pressures are applied. It would thus be possible for the plastic preform to initially have a pre-blow pressure and subsequently an intermediate blow pressure and finally a finish blow pressure applied to it. Advantageously here, a plurality of valves is provided, which provide the individual pressures.

Preferably, the apparatus has at least one reservoir and preferably several reservoirs in order to provide the pressurised air for expanding the plastic preforms. These reservoirs may also provide pressurised air at different pressure levels. Preferably, at least one of these reservoirs and particularly preferably several of these reservoirs are implemented as annular channels.

Further, the apparatus preferably has a control unit that controls the individual valve devices. Thus, the containers may, as mentioned above, have the respective pressures successively applied thereto.

In a further embodiment according to the invention, the apparatus has a detection unit that is suitable and intended to receive at least one measurement value that is characteristic of the movement of the bottom portion. In this embodiment according to the invention, too, an improved adaptation of the individual traversing paths is achieved. However, this is here achieved by determining the movement of the piston and of the bottom portion, respectively.

Advantageously, this is here a measurement value that is selected from a group of measurement values that comprises a traversing position, a speed, a lifting height and the like. Apart from that, however, the detection unit may also receive oscillations, vibrations and the like.

It is pointed out that the detection unit described here may also find application independently of the embodiment of the stroke path limiting means. The Applicant reserves the right to claim protection for a forming unit for forming plastic preforms into plastic containers and in particular into plastic bottles, which has a blow mould that comprises a first lateral portion and a second lateral portion as well as a bottom portion. These lateral portions as well as the bottom portion form a cavity, within which the plastic preforms can be formed into the plastic bottles, wherein the bottom portion being movable relative to the lateral portions in a closed condition of the blow mould and wherein the forming unit further has a drive unit in order to move the bottom portion relative to the lateral portions. Further, the drive unit preferably has a movable piston element that can be moved within a predetermined stroke path.

According to the invention, the apparatus has a detection unit that is suitable and intended to receive at least one measurement value that is characteristic of the movement of the bottom portion.

Thus it is preferably possible to poll a position of the bottom portion or of the piston element or a cylinder, respectively, for the actuation of the bottom portion, for example by means of detection units or sensors. These detection units may for example be microswitches, inductive proximity switches, light barriers or other electronic or electromechanical components. Moreover or in addition it would also be possible for a digital polling of certain positions of the bottom portion to be carried out, preferably an upper and/or a lower end position. Moreover it is also possible to carry out an analogous continuous polling of the bottom portion or the cylinder, for example via a position sensor. In this way, the current position may be determined at any time over the entire traversing path. Preferably, a coupling to a control unit via a digital interface may be achieved. It is possible here to compare at each individual forming station in each case a target traversing profile with an actual traversing profile.

Advantageously, the apparatus comprises a control unit that controls the forming unit in response to this data. In this way, in particular the stroke movement of the bottom portion may be controlled more accurately, also in particular in respect to a start-up of the respective stops.

Altogether, in this way a more accurate control and monitoring of the working process may be achieved also in the case of a plurality of units. In addition, also the weight of the moved components may be minimised. In addition, it is also possible to reduce wear and tear on the media supply lines. It is also possible to synchronise the individual working cycles of the bottom lifting units relative to each other. In this way, a more accurate working process may be achieved. Moreover, also the lifting height may be adapted to the container geometry or to specific container properties.

In a further advantageous embodiment, the apparatus has a pressure chamber in order to apply a pressure medium onto the piston, and preferably the stroke limiting means is arranged outside of this pressure chamber.

In a preferred embodiment, the stroke path limiting means is arranged below said pressure chamber. This applies in particular to embodiments where the plastic preforms are blown in an upright position.

In a further advantageous embodiment, the stroke path limiting means can be adjusted in the direction of movement of the piston. In this way, at least one end position of said piston may be modified. It would thus be possible to move the piston in principle up to a certain maximum level, for example approximately 20 mm. Preferably, however, a movement of up to 14.9 mm and 19.8 mm and preferably between 17 and 19 mm is possible. In order to be able to adjust this stroke height and to adjust it in particular in a mechanical manner, said stroke path limiting means may be adjusted.

Advantageously, the stroke path limiting means are stops that may particularly preferably be manually modifiable.

It is thus possible in a preferred embodiment, for the purpose of adjustability, to use means that limit the stroke path. Thus, for example, the stroke path limiting means has a bracket for holding a stop disc and this stop disc. In order to adjust the stroke path, this stop disc may be replaced with another stop disc, for example a stop disc having a reduced thickness. It would also be possible to arrange several such stop discs one above the other.

Advantageously, the one or more stops are replaced with one or more stops having a modified height, in order to manually extend the stroke path. In order to reduce the stroke path, the one or more stops are in turn replaced with one or more stops that have a reduced height. It would also be conceivable to arrange several stops above each other in order to adjust the respectively desired stroke path. As mentioned, these stops are here preferably located outside and particularly preferably below a pressure chamber. The adjustability of the height can here be achieved in various ways. Thus, for example, different stop forms may be used, or washers and/or shims may additionally be used.

As mentioned above, also a position detection unit such as in particular a sensor is preferably provided, which records relevant data such as for example a traversing height, a bottom position, a traversing speed and similar relevant data such as oscillations, vibrations and micromovements. In addition, by determining this mentioned data, also a process time may be read out or may be accurately determined and regulated, in order to ensure a similar or symmetric working time of individual forming units relative to each other.

Preferably, in this way, the individual forming stations of a system may be adjusted such that approximately or exactly the same working time is required in order to carry out or pass through a working cycle. In a further advantageous embodiment, the forming unit has at least one first tempering agent connection in order to temper the bottom portion by means of a flowable tempering agent. Advantageously, this is a liquid tempering agent. In this way, the bottom portion of the blow mould may be tempered in precisely the manner desired or may have a temperature exactly as desired. Preferably, the forming unit also has a second tempering agent connection that may in particular be designed as a drain. In this way, a coolant circuit may be applied to the bottom portion.

It is possible for this tempering agent to be delivered to the bottom portion or the carrier thereof. In this way, tempering circuits may altogether be provided.

In a further advantageous embodiment, at least one tempering agent connection is positioned in such a way that it has to carry out a stroke movement as small as possible. Thus, for example, a tempering agent connection may be applied midway between an upper and a lower position of the bottom portion, so that no excessively high excursions or changes of direction have to be carried out.

In a further advantageous embodiment, the forming unit has a second stroke travel limiting means that limits the stroke movement of the piston element in a second direction, wherein this stroke limiting means is preferably adjustable in order to modify the stroke path. In this way, the stroke path of the bottom portion or of the piston may be adjusted in both directions. Thus, a minimum height and a maximum height may be specified. In this way, too, a more accurate control of the forming process and in particular of the production of the bottom region of the container is achieved.

In a further advantageous embodiment, a drive unit for moving the bottom portion has a throttle unit in order to throttle the movement of the bottom portion. As a result of this throttle unit, a very precise movement of the bottom portion is possible. Advantageously, the drive unit is a pneumatic drive unit. In a further advantageous embodiment, an electronic throttle unit, in particular in the form of a throttle valve, is used in order to be able to adjust or regulate or monitor the traversing movement even more accurately. Here, in particular also a movement speed or a stroke height may be adjusted.

Altogether, in the manner described, a more accurate control and monitoring of the working process of the individual units may be achieved. Also a weight of the moved components may be reduced in this way. Moreover, also wear and tear on the media supply lines is reduced. In addition, also the individual working cycles of the bottom stroke units may be better synchronised relative to each other, as a result of which a more accurate working process is achieved. Advantageously, it is also possible to achieve adjustability of the stroke height to the container geometry or the container properties.

Altogether, the invention also solves the problem of ensuring a more constant and consistent switching time. In general, a certain amount of variance has to be expected between different stations. The different times of the upward movement as well as the different traversing speed of the mould bottom reduce the consistent quality of the containers to be produced.

The present invention is further directed to a method for forming plastic preforms into plastic containers and in particular into plastic bottles. To this end, in a first method step, a plastic preform is inserted into a blow mould, wherein this blow mould has at least two lateral portions as well as a bottom portion, which together delimit a cavity, within which the plastic preform is expandeble.

In a further method step, the plastic preform is applied with a first pressure. In a further method step, the plastic preform is applied with a second pressure, which deviates from the first pressure and is preferably greater than the first pressure. In a further method step, the plastic preform is applied with a third pressure, which deviates from the first pressure and/or from the second pressure and is preferably greater than this first pressure and/or the second pressure.

Further, the bottom portion is fed towards the plastic preform at least once during the expansion.

According to the invention, the apparatus has a first stroke path limiting means that limits the stroke movement of the bottom portion in a first direction, wherein this stroke path limiting means is adjustable in order to modify the stroke path.

In a further alternative embodiment of the method according to the invention, at least one measurement value may be received cumulatively or alternatively by means of the detection unit, which measurement value is characteristic of the movement of the bottom portion.

The two variants proposed here each solve the problem of achieving a more accurate control of the movement of the bottom portion. Also, a more accurate adaptation of different forming stations may be carried out in this way.

In a further embodiment according to the invention, which may be carried out or applied in addition or as an alternative to the variants described above, a movement of the bottom portion is activated essentially at the same time as the application of at least one of the mentioned pressures.

In a preferred method, the application of the respective pressures onto the containers is carried out by switching corresponding valves. Thus, the application of the first pressure onto the plastic preforms may be achieved by opening a first valve. Preferably, also the application of the second pressure onto the plastic preforms may be achieved by opening a second valve. In the course of this, the first valve may be closed again or may remain open. Preferably, also the application of the third pressure onto the plastic preforms is carried out by opening a corresponding valve.

As a result of the adaptation or switching of the bottom portion according to the invention as described above, the method may also be simplified. Advantageously, the movement of the bottom portion is initiated within a period of time that deviates by no more than plus or minus 10% from the time of switching of the second pressure or the application of the second pressure. Advantageously, this time window is smaller than 10%. Preferably, the bottom portion remains in its top position, which means a position adapted to the plastic, up to shortly before the opening of the blow mould or in any case preferably up to the point at which the corresponding second pressure has essentially escaped or has been discharged from the container.

Preferably, by means of the above-mentioned method it is also possible to compare the target traversing profile with the actual traversing profile in each individual forming station. Thus, for example the time may be measured that passes between an electrical switching signal of a pneumatic valve up to the actuation of the sensor unit. As a result of this comparison of target and actual traversing profiles, an allowance for a blow process in the next blow run may be determined in each case. If the desired position is reached too late, it may be possible to switch a pneumatic valve for the bottom portion at an earlier point in time. Conversely, if the desired position is reached too soon, a pneumatic valve may be switched at a later point in time.

By means of this method, it is also possible to match individual forming stations to each other and any slow drifting away for example as a result of run-in may be compensated.

Even if it cannot always be ensured for technical reasons that the bottom portions always traverse at the same speed (e.g. due to different controls). The control proposed here therefore always preferably refers to a certain position of the traversing profile of the bottom portion. Thus, for example, the control may be carried out in such a way that the starting position of the bottom portion is left always at the same point in time. Alternatively or in addition a control may be carried out in such a way that the end position of the bottom portion is always reached at the same point in time. Moreover, it would also be possible for any parameterisable intermediate position of the bottom portion to be always passed at the same point in time. This intermediate position may for example be a position between a starting position and the end position of the bottom portion and may preferably be a position midway between the starting position and the end position.

In this way, the container quality may also be reached in a first round after a prolonged down time. Thus, prior of the entry of the first plastic preforms, it would also be possible to operate the bottom portions in a calibration process empty for one round, and to measure the delay times. This may be carried out because usually the last measurement is a long time back and the second ones may additionally have been modified during the standby operation.

In a further advantageous method, the feed movement of the bottom portion towards the plastic preform may be controlled and/or regulated on the basis of the received measurement value. In this embodiment, in particular a method is proposed wherein the received measurement value is taken into account in particular also during the feeding movement of the bottom portion. However, in addition it would also be possible to take into account this measurement value during the control and regulation of other method steps, such as the application of pressure onto the plastic preforms.

Further advantages and embodiments result from the attached drawings, wherein.

Figure 1:
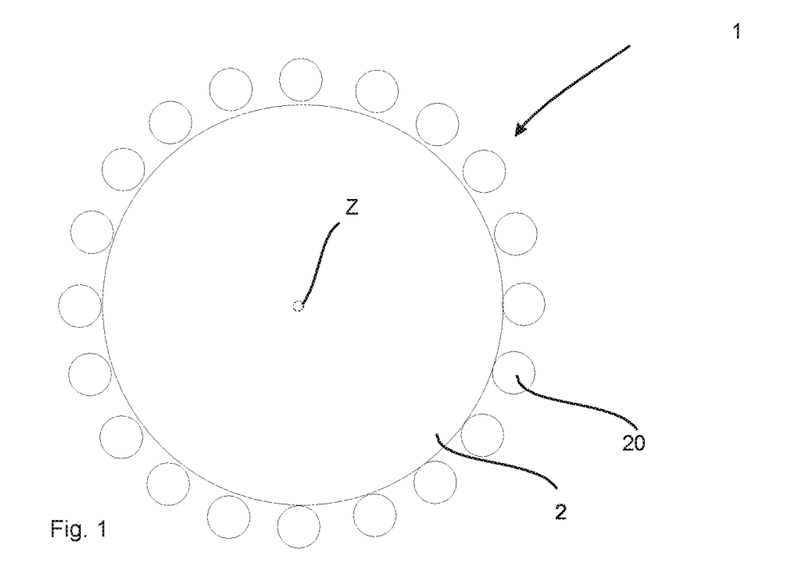
FIG. 1 shows a schematic representation of an apparatus for forming plastic preforms into plastic containers.

FIG. 1 shows a schematic illustration of an apparatus 1 according to the invention for forming plastic preforms into plastic containers. This apparatus has a rotatable carrier 2 that can be rotated in respect of the rotational axis Z. On this carrier, a plurality of forming stations 20 is arranged.

Figure 2:
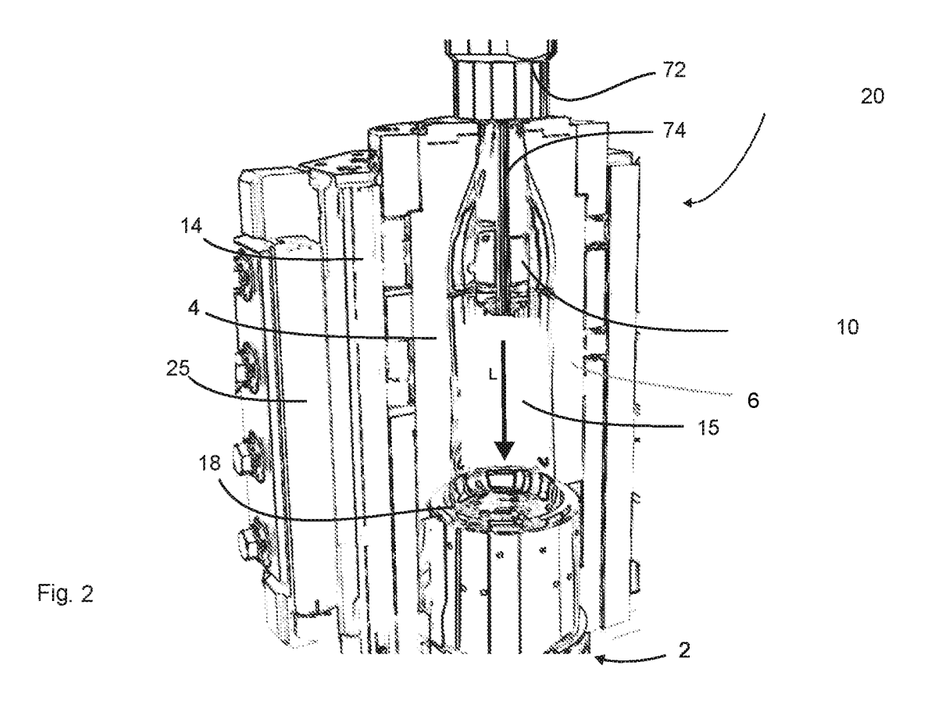
FIG. 2 shows a partial representation of a forming station.

FIG. 2 shows a sectioned view of a forming station or forming unit 20. Here, a first blow moulding portion or lateral portion 4 is shown. This lateral portion is arranged on a blow mould carrier portion 25 via a carrier tray 14. A second blow mould portion or a second carrier portion is not shown in FIG. 2. Reference numeral 18 identifies a bottom portion of the blow mould which, as mentioned above, can be lowered and lifted. To this end, the drive mechanism or lifting mechanism is provided, as will be described in more detail below.

Reference numeral 15 identifies a cavity, within which the plastic preforms 10 can be expanded into plastic bottles. Reference numeral 74 identifies a stretching rod that can be inserted into the containers through a mouth thereof, in order to stretch the latter in their longitudinal direction L.

Reference numeral 72 identifies an application unit such as for example a blow nozzle, via which the air for expansion may be supplied to the plastic preforms.

Figure 3:
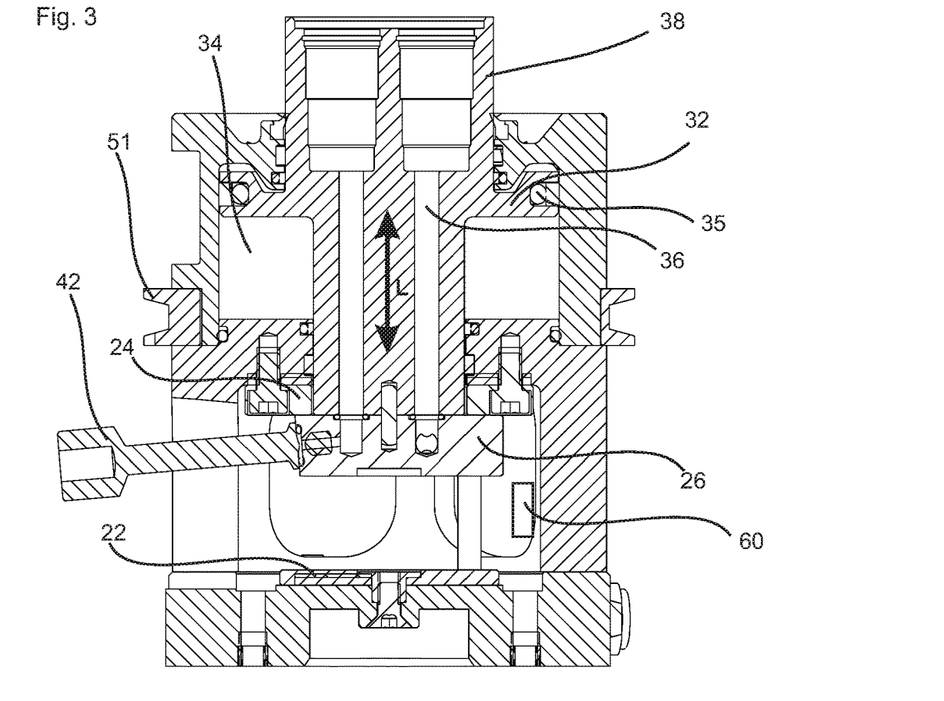
FIG. 3 shows a representation of a lifting mechanism for a bottom portion.

FIG. 3 shows a first sectional view of the lifting mechanism for lifting and lowering the bottom portion. Reference numeral 38 relates here to a carrier, on which a component of the bottom portion may be arranged. This carrier is a component of a piston element 32 that can be moved here in the direction L, namely by a predetermined stroke. To this end, the piston has a piston plate 26 that is sealed against the piston chamber 34 that also acts as pressure chamber 34, and can move relative to the latter in said longitudinal direction. Reference numeral 35 identifies a corresponding sealing unit that may here be implemented for example as an O-ring.

Reference numeral 51 identifies a fastening element, into which for example corresponding areas of the lateral portions may engage so as to be able to securely close the blow mould.

Reference numeral 22 identifies a first stroke path limiting means that limits the stroke path of the piston element 32 here towards the bottom. This stroke path limiting means is exchangeable or can be modified in respect of its height, so that also the stroke path may be modified. This stroke path limiting means serves as a stop for a plate element 26 which is a component of the piston element 32.

Reference numeral 24 identifies a second stroke path limiting means that limits the stroke path of the piston element 32 also in the upward direction. Both stroke path limiting means may be modified in their position along the direction L of the plastic preform, so that also altogether the stroke path may be adjusted in both directions.

Reference numeral 36 identifies a channel for transporting a tempering medium. This tempering medium may here be supplied via a port 42. This port is arranged on the plate element 26 and therefore moves together therewith.

Reference numeral 60 identifies in a very schematic manner a detection unit or sensor unit that records data which are characteristic of a movement of the piston element 32, such as a position of the piston element, a speed of movement, an acceleration and the like.

Figure 4:
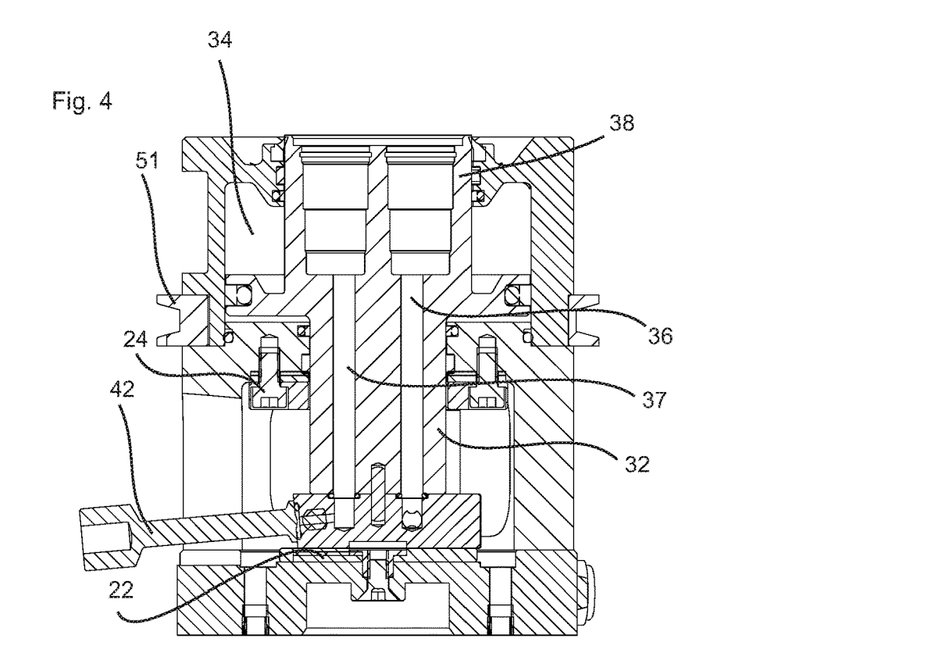
FIG. 4 shows a further representation of a lifting mechanism for a bottom portion.

FIG. 4 shows an illustration corresponding to that of FIG. 3. In the situation shown in FIG. 4, however, the bottom portion or the carrier 38 thereof is in a lower position or retracted position. In the situation shown in FIG. 3, the bottom portion is fed to the plastic preform or the plastic container.

Figure 5:
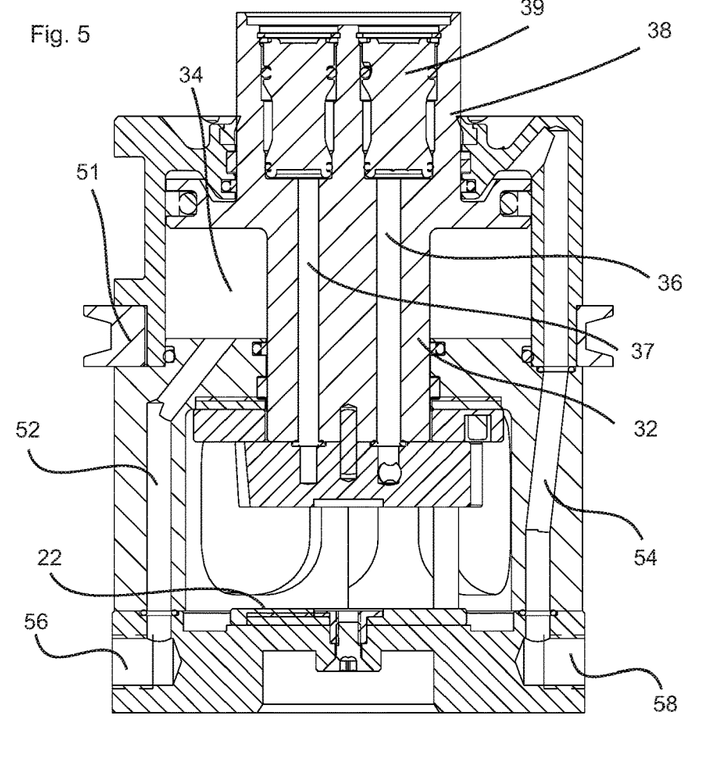
FIG. 5 shows a further representation of a lifting mechanism for the bottom portion.

FIG. 5 shows a further illustration of the apparatus according to the invention. What can be seen here is a flow 36 and a return 37, which are used for supplying the tempering medium to the bottom portion. Reference numeral 39 identifies coupling units that can be used to connect the bottom portion fluidically with the carrier 38. These couplings also allow the transport or the guidance of the tempering medium.

Reference numeral 52 shows a first channel that is used for supplying air into the piston chamber 34. As a result of the supply of pressurised air, the piston 32 may be moved upwards. Reference numeral 54 identifies a second air channel that also opens into the piston chamber 34, however at the top side thereof. Thus, the pressurised air supplied here can be used to move the piston 32 back down again.

Reference numeral 56 identifies a port for supplying pressurised air, and also reference numeral 58 identifies a corresponding port. These two ports can each be used to supply pressurised air in order to lift and lower the piston element 32.

Figure 6:
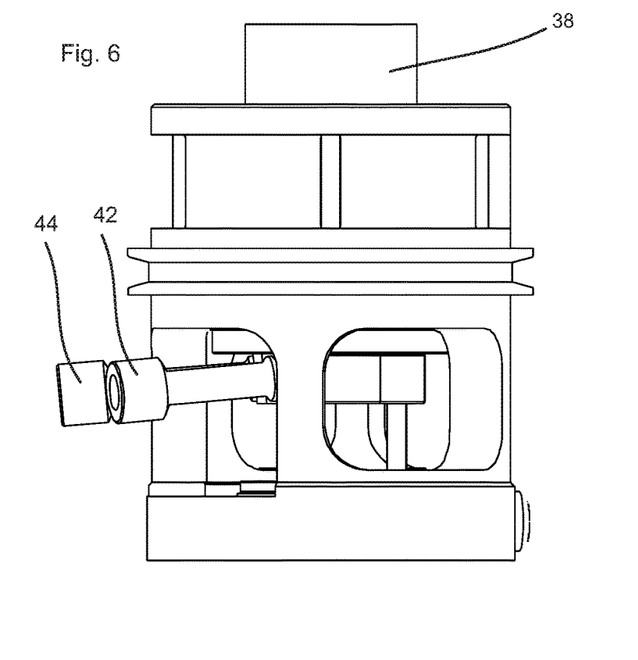
FIG. 6 shows an exterior view of the lifting mechanism shown in the previous figures.

Finally, FIG. 6 shows an overall view of the drive mechanism according to the invention. Here, both ports 42 and 44 can be seen, which are used as flow and return for the tempering medium. Here again the carrier 38 can be seen on which the bottom portion (not shown) is then located.

Figure 7:
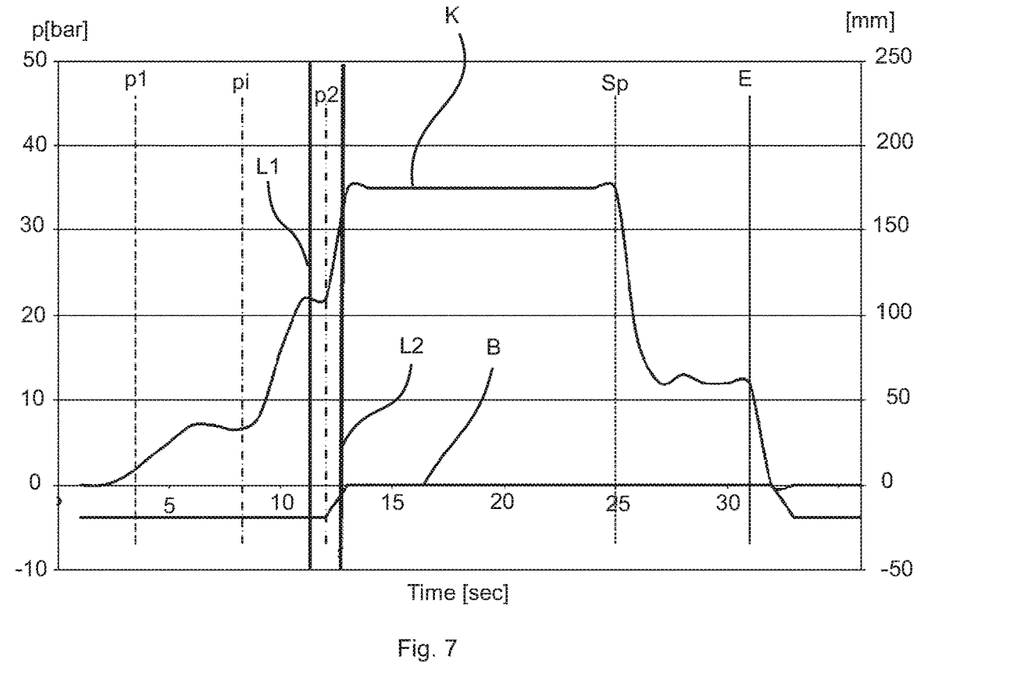
FIG. 7 shows a pressure curve for the application of pressure onto the plastic preforms.

FIG. 7 shows a view for illustrating the individual pressure ratios during application onto the plastic preforms. Reference sign K relates to a curve that shows the pressure profile over the time. Here, the vertical lines each refer to the points in time at which the respective pressure ratios change or at which in each case a new pressure level is applied to the plastic preform. These individual pressure levels are reached by switching of different valves.

Reference sign $p_1$ identifies a first pressure or pre-blow pressure. Reference sign $p_i$ identifies a second pressure that is also referred to as intermediate blow pressure. Reference sign $p_2$ identifies the third pressure that is also referred to as finish blow pressure. Reference sign Sp identifies a rinsing pressure that is applied to the container in time after the finish blow pressure.

Finally, reference sign E identifies the relief of the finish-formed container, i.e. the period of time, during which pressure is released from the container.

The second curve B identifies the movement of the bottom portion. It can be seen that this bottom portion is fed at the same time as the beginning of the application of finished blow pressure p2 onto the plastic preform. Within a correction window formed by the two vertical lines L1 and L2, the point in time of feeding the bottom portion can be shifted.

Figure 8:
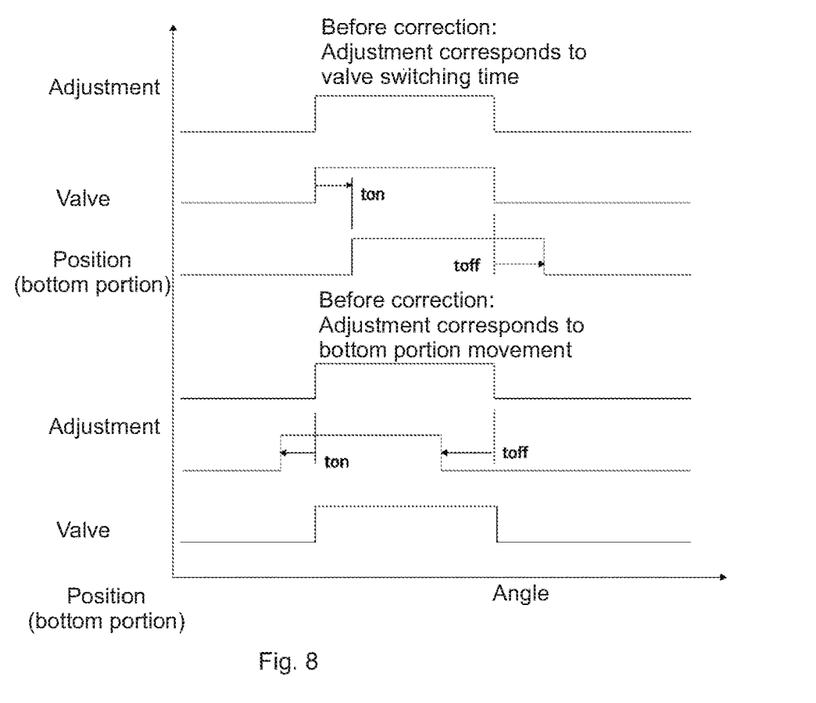
FIG. 8 shows an illustration of a timing correction of the movement of the bottom portion.

FIG. 8 illustrates the correction of the feeding movement of the bottom portion. The top part of this figure shows the situation before correction. Here, an adjustment point and the switching point coincide. After a certain time delay, also the bottom portion is fed. However, this does not adjust the movement of the bottom portion to the desired basic setting.

In the situation shown in the bottom part of the figure, a correction has been carried out. Here, the valve was switched earlier. It can be seen that in this situation, the movement of the bottom portion corresponds to the desired adjustment values.

The applicant reserves the right to claim all of the features disclosed in the application document as being essential to the invention, insofar as they are novel over the prior art either individually or in combination. Further, it is pointed out that the individual figures also describe features which taken by themselves may be advantageous. A person skilled in the art will immediately realise that a certain feature described in a figure may be advantageous even without adopting further features from this figure. A person skilled in the art will also realise that the advantages may be achieved by a combination of several features shown in individual or in different figures.

LIST OF REFERENCE NUMERALS 1 apparatus for forming plastic preforms into plastic containers
2 rotatable carrier
4 blow mould portion
10 plastic preforms
14 carrier tray
15 cavity
18 bottom portion of the blow mould
20 forming stations
22 first stroke path limiting means
24 second stroke path limiting means
25 blow mould carrier portion
26 plate element
32 piston element
34 piston chamber, pressure chamber
36 channel for transporting a tempering medium, flow
37 return
38 carrier
39 coupling units
42 port
44 port
51 fastening element
52 first air channel
54 second air channel
56 port for supplying pressurised air
58 port for supplying pressurised air
60 detection unit or sensor unit
72 application unit
74 stretching rod
L longitudinal direction
Z rotational axis
p1 first pressure, pre-blow pressure
pi second pressure, intermediate blow pressure
p2 third pressure, finish-blow pressure
Sp rinsing pressure
E relief
K blow curve
B movement of the bottom portion

The invention claimed is:

1. A forming unit (20) for forming plastic preforms into plastic bottles, wherein the forming unit comprises a blow mould (20) having a first lateral portion (4), a second lateral portion (6) and a bottom portion (18), wherein said lateral portions as well as the bottom portion (18) form a cavity (15), within which the plastic preforms (10) can be formed into the plastic bottles, wherein the bottom portion (18) can be moved relative to the lateral portions (4) in a closed condition of the blow mould, wherein the forming unit (20) comprises a drive unit in order to move the bottom portion (18) relative to the lateral portions (4, 6), wherein the drive unit has a movable piston element (32) which is movable along a predefined stroke path, characterised in that the apparatus has a first stroke path limiting means (22, 24) that limits the stroke path of the bottom portion (18) and/or of the piston element (32) in a first direction, wherein this first stroke path limiting means (22, 24) is adjustable in order to modify the stroke path.

2. The forming unit (20) as claimed in claim 1, characterised in that the apparatus has a pressure chamber (34) in order to apply a pressure medium onto the piston, and the first stroke path limiting means (22, 24) is arranged outside of this pressure chamber (34).

3. The forming unit (20) as claimed in claim 2, characterised in that the first stroke path limiting means (22, 24) is arranged below the pressure chamber (34).

4. The forming unit (20) as claimed in claim 1, characterised in that the first stroke path limiting means (22, 24) can be adjusted in the movement direction (L) of the piston element (32).

5. The forming unit (20) as claimed in claim 1, characterised in that the forming unit (20) has at least one tempering agent port (42) in order to temper the bottom portion (18) by means of a flowable tempering agent.

6. The forming unit (20) as claimed in claim 1, characterised in that the forming unit (20) has a detection unit (6) that is suitable and intended to receive at least one measurement value which is characteristic of the movement of the bottom portion (18).

7. The forming unit (20) as claimed in claim 1, characterised in that the forming unit (20) has a second stroke path limiting means (24) that limits the stroke movement of the piston element (32) in a second direction, wherein said second stroke path limiting means is adjustable in order to modify the stroke path.

8. The forming unit (20) as claimed in claim 1, characterised in that a drive unit has a throttle unit in order to throttle the movement of the bottom portion (18).

9. A method for forming plastic preforms (10) into plastic containers, comprising the following steps:
inserting a plastic preform (10) into a blow mould, wherein said blow mould has at least two lateral portions (4) as well as a bottom portion (18), which together limit a cavity (15), within which the plastic preform (10) is expandeble;
applying a first pressure (p1) onto the plastic preform (10);
applying a second pressure (pi) onto the plastic preform, which deviates from the first pressure (1) and is greater than the first pressure (p1);
applying a third pressure (p2) onto the plastic preform, which deviates from the second pressure (p2) and is preferably greater than the second pressure (pi), wherein the bottom portion (18) is being fed to the plastic preform (10) at least once during the expansion process, characterised in that a first stroke path limiting means (22) is provided, which limits the stroke movement of the bottom portion (18) in a first direction, wherein this first stroke path limiting means (22) is adjustable in order to modify the stroke path and/or by means of a detection unit at least one measurement value that is characteristic of the movement of the bottom portion (18) is received.

10. The method as claimed in claim 9, characterised in that a path travelled by the piston element (32) and/or the bottom portion (18) is determined.

11. The method as claimed in claim 9, characterised in that a traversing profile of the bottom portion (18) is determined.

12. The method as claimed in claim 9, characterised in that on the basis of the received measurement value, the feeding movement of the bottom portion towards the plastic preform is controlled and/or regulated.

13. A forming unit (20) for forming plastic preforms (10) into plastic bottles, wherein the forming unit (20) comprises a blow mould with a first lateral portion (4), a second lateral portion and a bottom portion (18), wherein said lateral portions (4) as well as the bottom portion (18) form a cavity (15), within which the plastic preforms (10) can be formed into the plastic bottles, wherein the bottom portion (18) can be moved relative to the lateral portions (4) in a closed condition of the blow mould, wherein the forming unit comprises a drive unit in order to move the bottom portion (18) relative to the lateral portions (4), wherein the drive unit has a movable piston element (32) which is movable along a predefined stroke path, characterised in that the forming unit (20) has a detection unit (60) which is suitable and intended to receive at least one measurement value that is characteristic of the movement of the bottom portion (18).

* * * * *

UNITED STATES PATENT AND TRADEMARK OFFICE
CERTIFICATE OF CORRECTION

PATENT NO. : 11,331,846 B2
APPLICATION NO. : 16/480399
DATED : May 17, 2022
INVENTOR(S) : Andreas Pense It is certified that error appears in the above-identified patent and that said Letters Patent is hereby corrected as shown below:

In the Claims

Column 10, Claim 9, Line 64, delete "preferably" before "greater than the second pressure (pi)"

Signed and Sealed this
Nineteenth Day of July, 2022

Katherine Kelly Vidal
Director of the United States Patent and Trademark Office